United States Patent
Agombar et al.

(10) Patent No.: US 10,210,062 B2
(45) Date of Patent: Feb. 19, 2019

(54) DATA STORAGE SYSTEM COMPRISING AN ARRAY OF DRIVES

(71) Applicant: International Business Machines Corporation, Armonk, NY (US)

(72) Inventors: John P. Agombar, Winchester (GB); Ian Boden, Eastleigh (GB); Gordon D. Hutchison, Eastleigh (GB); Lee J. Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 15/617,322

(22) Filed: Jun. 8, 2017

(65) Prior Publication Data

US 2018/0357141 A1 Dec. 13, 2018

(51) Int. Cl.
 *G06F 11/20* (2006.01)
 *G06F 3/06* (2006.01)
 *G06F 11/16* (2006.01)

(52) U.S. Cl.
 CPC ........ *G06F 11/2089* (2013.01); *G06F 3/0619* (2013.01); *G06F 3/0658* (2013.01); *G06F 3/0689* (2013.01); *G06F 11/1666* (2013.01); *G06F 11/2094* (2013.01); *G06F 2201/805* (2013.01)

(58) Field of Classification Search
 CPC ............................. G06F 11/20; G06F 11/2089
 USPC ........................................................ 714/6.21
 See application file for complete search history.

(56) References Cited

U.S. PATENT DOCUMENTS

| | | | | |
|---|---|---|---|---|
| 6,574,763 B1* | 6/2003 | Bertin | ................. | G01R 31/287 324/750.05 |
| 7,257,674 B2* | 8/2007 | Kobayashi | .......... | G06F 11/1084 709/201 |
| 8,938,644 B2* | 1/2015 | Clark | ................. | G06F 11/0727 707/718 |
| 9,760,480 B1* | 9/2017 | McKelvie | ........... | G06F 12/0246 |
| 2004/0153833 A1* | 8/2004 | Deacon | ............... | G06F 11/0727 714/38.14 |
| 2008/0065847 A1* | 3/2008 | Agombar | ............ | G06F 11/2071 711/162 |

(Continued)

FOREIGN PATENT DOCUMENTS

CN 103268269 A 8/2013

*Primary Examiner* — Kamini B Patel
(74) *Attorney, Agent, or Firm* — Nelson and Nelson; Daniel P. Nelson; Alexis V. Nelson (57) ABSTRACT

A data storage system comprises a primary storage system comprising an array of drives and a storage controller comprising a stack of storage components. A storage component of the stack operates a data redundancy scheme for the primary storage system. The storage controller stores a set of data on the primary storage system, detects a failure on one or more drives and determines a set of addresses defining data that cannot be completely repaired. Starting with the storage component operating the data redundancy scheme, each storage component queries the storage component directly above with the set of addresses for the data that cannot be completely repaired, obtaining, from one or more storage components, the data that cannot be completely repaired. This obtained data is used to repair the data on the primary storage system with the data from the one or more storage components.

15 Claims, 5 Drawing Sheets

(56) References Cited

U.S. PATENT DOCUMENTS

| | | | |
|---|---|---|---|
| 2008/0222448 A1* | 9/2008 | Nash | G06F 11/0793 |
| | | | 714/2 |
| 2009/0097334 A1* | 4/2009 | Kurozumi | G11C 29/842 |
| | | | 365/189.12 |
| 2010/0138691 A1* | 6/2010 | Kumar | G06F 11/1076 |
| | | | 714/6.23 |
| 2013/0117506 A1* | 5/2013 | Glickman | G06F 3/0683 |
| | | | 711/114 |
| 2016/0103746 A1* | 4/2016 | Bartlett | G06F 11/2094 |
| | | | 714/6.22 |
| 2017/0116074 A1* | 4/2017 | Hayes | G06F 11/1076 |

\* cited by examiner

DATA STORAGE SYSTEM COMPRISING AN ARRAY OF DRIVES

BACKGROUND

The present invention relates to a method of operating a data storage system that comprises an array of drives and to the data storage system itself.

SUMMARY

According to a first aspect of the present invention, there is provided a method of operating a data storage system comprising a primary storage system comprising an array of drives and a storage controller connected to the primary storage system and comprising a stack of storage components, a storage component of the stack of components arranged to operate a data redundancy scheme for the primary storage system, the method comprising storing a set of data on the primary storage system, detecting a failure on one or more of the drives of the array of drives, determining a set of addresses defining data that cannot be completely repaired by the data redundancy scheme, starting with the storage component operating the data redundancy scheme, each storage component querying the storage component directly above with the set of addresses for the data that cannot be completely repaired by the data redundancy scheme, obtaining, from one or more storage components, the data that cannot be completely repaired by the data redundancy scheme, and repairing the data on the primary storage system with the obtained data from the one or more storage components.

According to a second aspect of the present invention, there is provided a data storage system comprising a primary storage system comprising an array of drives and a storage controller connected to the primary storage system and comprising a stack of storage components, a storage component of the stack of components arranged to operate a data redundancy scheme for the primary storage system, the storage controller arranged to store a set of data on the primary storage system, detect a failure on one or more of the drives of the array of drives, determine a set of addresses defining data that cannot be completely repaired by the data redundancy scheme, starting with the storage component operating the data redundancy scheme, each storage component querying the storage component directly above with the set of addresses for the data that cannot be completely repaired by the data redundancy scheme, obtain, from one or more storage components, the data that cannot be completely repaired by the data redundancy scheme, and repair the data on the primary storage system with the obtained data from the one or more storage components.

According to a third aspect of the present invention, there is provided a computer program product for controlling a data storage system comprising a primary storage system comprising an array of drives and a storage controller connected to the primary storage system and comprising a stack of storage components, a storage component of the stack of components arranged to operate a data redundancy scheme for the primary storage system, the computer program product comprising a computer readable storage medium having program instructions embodied therewith, the program instructions executable by a processor to cause the processor to store a set of data on the primary storage system, detect a failure on one or more of the drives of the array of drives, determine a set of addresses defining data that cannot be completely repaired by the data redundancy scheme, starting with the storage component operating the data redundancy scheme, each storage component querying the storage component directly above with the set of addresses for the data that cannot be completely repaired by the data redundancy scheme, obtain, from one or more storage components, the data that cannot be completely repaired by the data redundancy scheme, and repair the data on the primary storage system with the obtained data from the one or more storage components.

BRIEF DESCRIPTION OF THE DRAWINGS

Preferred embodiments of the present invention will now be described, by way of example only, with reference to the following drawings, in which.

DETAILED DESCRIPTION

Figure 1:
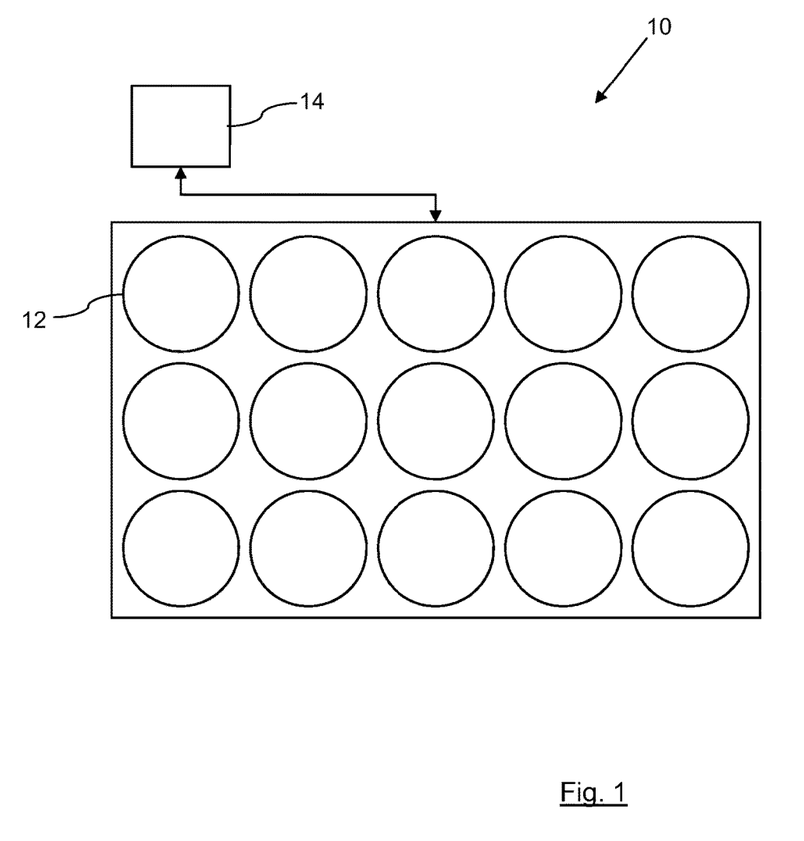
FIG. 1 is a schematic diagram of a data storage system.

FIG. 1 illustrates a data storage system that comprises a primary storage system 10 comprising an array of disk drives 12 and a storage controller 14 that is connected to the disk drives 12. Each drive 12 is shown schematically as a spinning disk, but each individual drive 12 may comprise a stack of spinning disks as a single hardware component. The disk drives 12 are shown in an array of rows and columns, but this is a logical arrangement of the disk drives 12 and the actual physical arrangement of the disk drives 12 may be much different. Each disk drive 12 is capable of storing a large amount of data, 4 TB and 6 TB disk drives being used in the arrangement 10.

The storage controller 14 is shown as a single component, for ease of understanding, but may in fact be comprised of a set of distributed components that perform the function of the storage controller 14. The primary purpose of the storage controller 14 is to read and write data to and from the disk drives 12, while ensuring that the necessary storage metrics (such as data latency and input/output actions per second) are monitored and that other tasks such as data recovery are performed. An array 10 such as that shown in FIG. 1 may perform the storage function of a very large enterprise such as an International bank, for example. The array of disk drives 12 could also be part of a data centre, for example.

The drives 12 are arranged in a RAID array, which is a defined storage standard that defines such elements as redundancy in the data stored, in order to protect against the failure of individual drives 12 to ensure that data is not lost and to ensure that data can be recovered quickly, following any failure of an individual disk drive 12. RAID defines various levels, RAID 1, RAID 2 and so on, which set exactly how data redundancy should be structured for the specific level being used, balancing various factors, such as speed of access, speed of recovery following failure and so on. Each RAID level provides a different balance between the goals of reliability, availability, performance, and capacity. Although the drives 12 in the RAID array 10 are here shown and described as spinning disks (hard disk drives), other types of drives 12 can be used, such as flash (solid state or SSD) drives or a combination of different technologies can also be used.

The primary storage system 10 shown in FIG. 1 is a distributed RAID array, sometimes referred to as a DRAID. Such arrays, which can contain for example between 4 and 128 individual drives 12, also contain rebuild areas that are used to maintain redundancy after an individual drive 12 fails. As a result, the distributed configuration dramatically reduces rebuild times and decreases the exposure that the volumes have to the extra load of recovering redundancy. Distributed RAID arrays solve these problems because rebuild areas are distributed across all of the drives 12 in the array. The rebuild write workload is spread across all the drives 12 rather just the single spare drive 12 which results in faster rebuilds of an array.

Distributed array configurations may contain between 4 and 128 drives. Distributed arrays remove the need for separate drives 12 that are idle until a failure occurs. Instead of allocating one or more drives 12 as spares, the spare capacity is distributed over specific rebuild areas across all the member drives 12. Data can be copied faster to the rebuild area and redundancy is restored much more rapidly. Additionally, as the rebuild progresses, the performance of the pool of drives 12 is more uniform because all of the available drives 12 are used for every volume extent. After a failed drive 12 is replaced, data is copied back to the drive 12 from the distributed spare capacity.

Unlike "hot spare" drives, read/write requests are processed on other parts of the drive 12 that are not being used as rebuild areas. The number of rebuild areas is based on the width of the array. The size of the rebuild area determines how many times the distributed array can recover one or more failed drives 12 without risking becoming degraded. Degraded means the loss of one drive, where a stride has suffered a loss, but where the data is still accessible either by using a remaining copy (applicable to RAID-1 and RAID-10), or using parity data to recover the data (RAID-5 and RAID-6). In RAID-5 degraded means that the system cannot suffer another failure, since another failure would result in data being lost. In RAID-6 degraded means the array has suffered a drive failure, critical degraded the system has suffered two drives failures but the data can still be recovered and one more failure means the data cannot be recovered.

For example, a distributed array that uses RAID 6 drives can process two concurrent drive failures. After the failed drives 12 have been rebuilt, the array can tolerate another two drive failures. If all of the rebuild areas are used to recover data, the array becomes degraded on the next drive failure. A distributed array can have a mixture of RAID levels within it. For example, a stride for a logical volume A within the array could be RAID-5, and another stride for a logical volume B within the array could be RAID-6, and a third, volume C within the array could be RAID-10. The RAID type is known as the geometry, so a distributed array could have mixed geometries.

In the context of a RAID array, a stride is a number of drives over which data is striped. Data is written to the array in a unit of strips, with one strip per drive. A strip is commonly expressed in units of 32 kbytes or 256 Kbytes. Take for example a strip size of 32 Kbytes, the first 32 Kbytes of the logical user volume is written to the 1st drive in the stride and the next 32 Kbytes of the logical user volume is written to the next strip. The stride size is the number of strips written before the start of the next stride. The stride size includes the parity strips in the size. So in this RAID-5 example, if the number of drives in the stride is eight, the number of user data strips is seven and this is expressed as 7+P. Seven data strips are written for one parity strip. Every N strides the parity (in the case of RAID-5/6) is rotated to another drive so that a specific drive is not used for parity. This allows for better utilisation of the drives, so the workload is evenly distributed amongst all drives.

When drive failures result in a distributed RAID array failing with lost user data, unlike traditional arrays, not all of the strides have lost user data. Unlike traditional RAID systems, distributed arrays use wide striping and a single distributed stride is not spread across all drives 12 in the array. Although the storage controller 14 is aware that the array 10 has lost some data, there will be data that is not lost. However, due to the low level spraying of strides evenly across all drives, in order to level out the n by n drive to drive IO involved in a recovery, and the complexity of the internal data layout/geometry, it is not trivial to know which data has been lost. Wide striping, in the context of a distributed array 10 refers to striping data over a much larger set of drives 12 to make use of the extra physical resource and bandwidth available in the system. Typically though, the array width could be much less than the actual number of physical drives 12 in the array 10. For example, in an array 10 with ten drives 12, there may be striping over five drives and the next consecutive stride could be using a different set of five drives.

Additionally, one drive 12 failing in a distributed array 10 is a much smaller proportion of physical storage lost, since in general distributed arrays are ten times the size of traditional arrays in terms of the number of disk drives 12 involved in one array 10. When data is lost, to restore the data requires the user data volumes (logical drives) that form the array 10 to be restored from backups. With traditional disk operations many potential schemes to avoid reading a small fraction of drives 12 are not particularly advantageous due to the drives high performance in reading long sequential IO streams with minimal head movement and no rotational latency.

However, with distributed arrays expected to be deployed with large disk drives such as 4 Terabytes and upwards and with the order of 100 to 200 drives in an array, rewriting whole volumes from backups would involve a massive amount of IO (for example 400 TB of data) that would flood any system for a considerable amount of time. Additionally, as it is likely that only around less than 1% of the data has been additionally impacted by the last drive to have failed in a 100+ drive array, given the overall size of the array 10 relative to a single drive failure. When framed like this, the need for new approaches to restoring data from backup for distributed arrays becomes pressing.

Restoration of data from a backup is a separate issue from a normal drive recovery using the employed first line of defense, which comprises using the RAID parity codes to recover the data from a lost drive 12 without having to make use of a backup. Experience unfortunately shows that multiple simultaneous drive failures mean that backups are still required and put to active use in the field, even for RAID 6 arrays. When such a backup is required, the restore time costs users money and tends to make a user even more impacted financially and thus negatively disposed to the system failure and a user tends to be aware of a restore from backup much more than any number of silent, RAID disk recoveries that do not impact availability of the data stored in the array 10.

The storage controller 14 operates a stack of storage components, shown in FIG. 2 and described in more detail below, where each component provides an interface to components above and makes use of an interface below, performing address and data transformations in both directions to achieve some specific service such as mirroring and RAID. Each component is optimized to quickly take data from above, perform any necessary operations which may involve some address translations and pass to the lower layer, which does the same in turn. The interfaces provided by the components can be based upon SCSI (Small Computer System Interface), which is a common interface standard, often used on top of another electronic medium such as Ethernet, Fibre Channel or SAS (Serial attached SCSI).

Usually for a component, the address used below is a function of the address given from above and the function is perfectly deterministic, otherwise data would be lost. It is also a requirement that the address translation is reversible so for an address passed to the component below, it must be possible to determine the original address that was passed from the component above. For example the command below uses the reverse address translation to determine an array address given a drive 12 in that array 10 and a drive address. The lsarraylba command below is a Command Line Interface command that a user could type in for an IBM SAN Volume Controller (SVC) or Storwize system.

lsarraylba
Use the lsarraylba command to permit an array logical block address (LBA) to be found from a drive and LBA.
Syntax
svcinfo lsarraylba -drivelba lba -drive drive_id
Parameters
-drivelba (the LBA on drive that is to be converted to the array LBA)
-drive (the ID of the drive to be viewed)
Description
This command enables an array LBA to be found from a drive.

With a reverse function for each component it is possible to chain these together to determine equivalent addresses in upper layers of the component stack. When there is a failed physical hard drive 12, the storage controller 14 can apply these functions transitively up through the component stack until the storage controller 14 reaches an address range that is meaningful to the backup strategy used. The storage controller 14 can now use this pipeline to resolve addresses (for only the unrecoverable-using-RAID-parity strides) on the failed hard drive 12 in terms of the LBAs and LUNs in the backups and can thus read from a backup only the data needed. This data is sent back down the pipeline of storage controller components and written to the replacement media (a failed drive 12 having been physically replaced with a new drive 12).

In a preferred embodiment, the storage controller 14 uses mirroring to maintain a backup copy of the data stored by the array 10 shown in FIG. 1. The primary copy of the data is stored on the distributed RAID array 10 and is spread over a large number of drives 12. The secondary (backup) copy of the data is stored on a separate set of drives, for example using a different RAID array or some other lower performing, lower cost storage. A system structured in this manner, with a primary distributed RAID array and a secondary lower quality backup storage system 16, could be configured using the IBM Storwize V7000 product as represented in FIG. 2.

Figure 2:
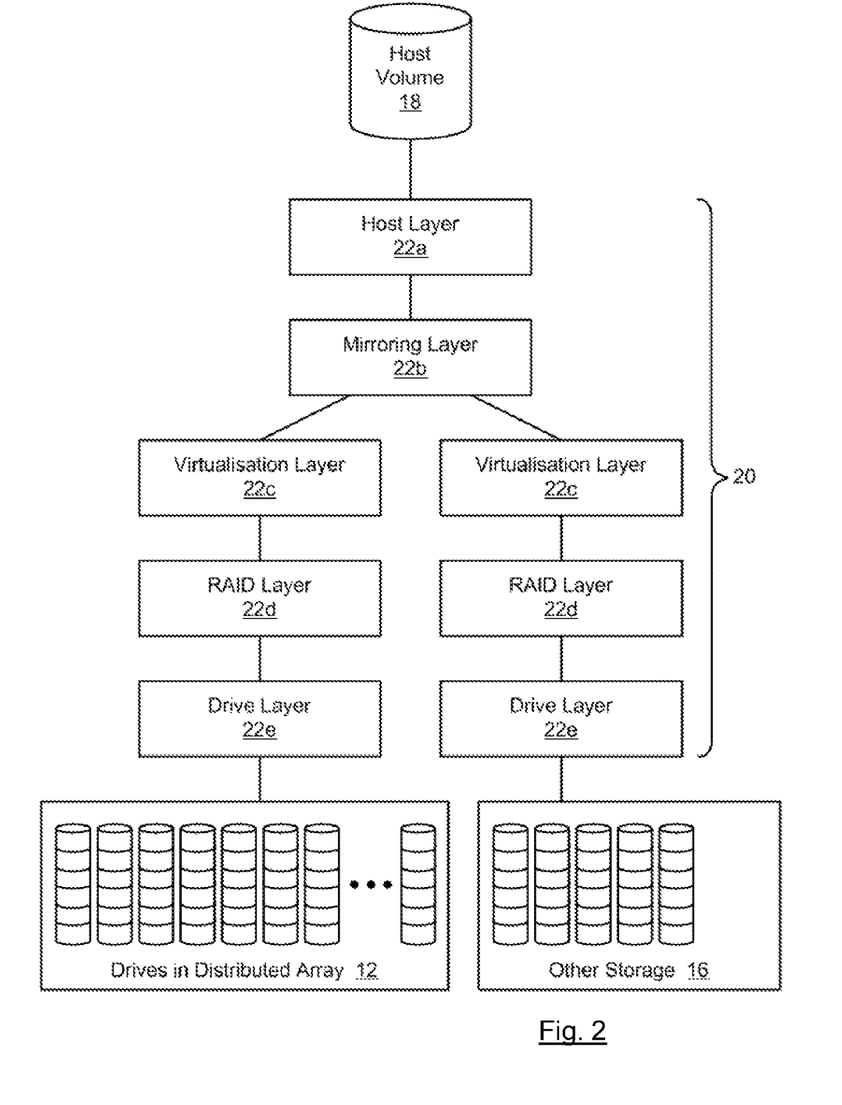
FIG. 2 is a schematic diagram of the data storage system showing a stack of storage components within a storage controller.

FIG. 2 shows a single volume 18 accessible to host computers on a storage area network, though in practice there may be many such volumes mirrored and stored on the distributed array 10. The distributed array 10 uses wide striping to spread the data represented by the volume 18 across all of the drives 12 in the array 10, but each stripe will only be stored on a subset of the drives 12. A stack 20 of storage components 22 is maintained by the storage controller 14. Component 22a is a host layer, component 22b is a mirroring layer, component 22c is a virtualisation layer, component 22d is a RAID layer (which operates a data redundancy scheme) and the component 22e is a drive layer.

Figure 3:
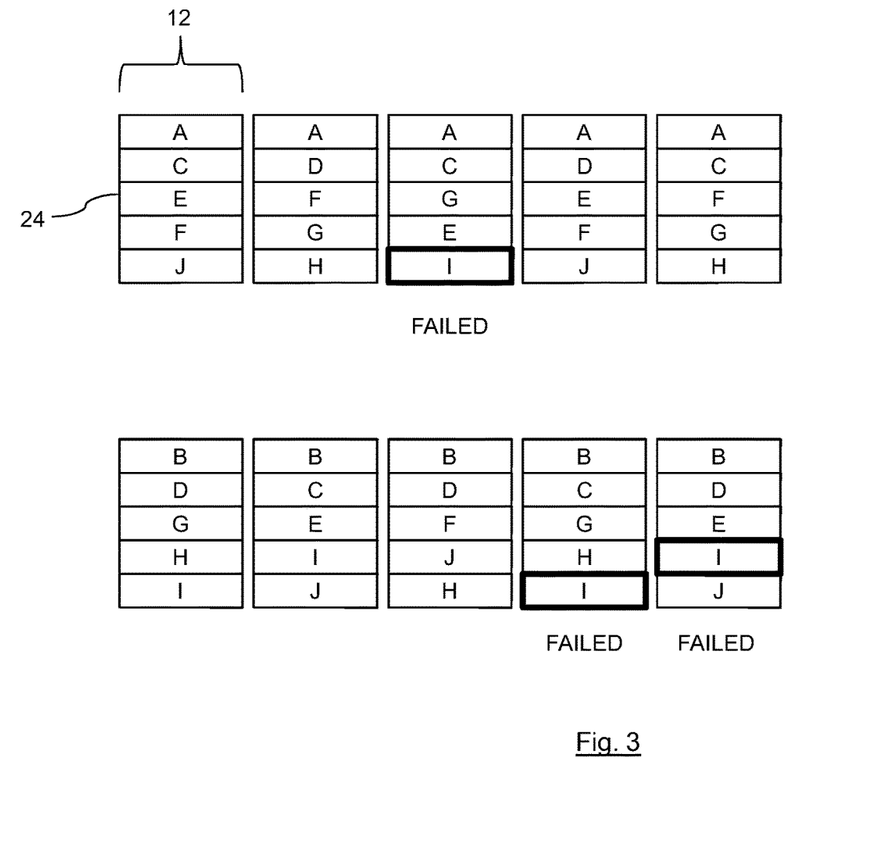
FIG. 3 is a schematic diagram of a set of drives.

The storage controller 14 can be embodied as an IBM San Volume Controller, which is preferably configured as a cluster of nodes within the storage controller 14, where each node can be connected by different technologies such as Ethernet, fibre channel and FCOE etc. Nodes are paired into IO groups, so logical volumes are accessed through either node within an IO group to access the volume and this provides for redundancy throughout the cluster. It is possible that in some user configurations, the cluster is "stretched" across a long distance link to another site, where each site has its own copy of the volume by virtue of the virtualisation layer 22c of FIG. 2. In this case, data could be restored from another site. FIG. 3 shows an example of how the data on the distributed array 10 might be spread across the drives 12 with a stride width of five and a total set width of ten. Each stride 24 is labelled with a letter of the alphabet and each stride 24 is stored on a different set of drives 12 from those available. A typical geometry would ensure that each drive 12 provides an equal number of strides 24 over a region of the array 10 to distribute the IO evenly between drives 12. Assuming that the array is RAID 6 with two copies of parity, then the array can continue to operate with any two failed drives 12, but the failure of a third drive 12 will mean that some strides will have lost three elements and will no longer be available. Considering the three drives 12 marked "FAILED" in FIG. 3, the stride 24 labelled "I" has lost three elements, but all other strides 24 have lost two or fewer elements. The other strides 24 can be restored using the RAID data redundancy, but the "I" stride cannot.

In a traditional recovery procedure for this scenario, the RAID layer cannot recover the data on the array and it is up to the user to recreate the array. Given that the user has a mirrored copy of the data stored on this array 10 they would normally replace the failed drives 12 and then use the mirroring layer to resynchronise all of the data from the good copy 16 back to the distributed array 10. This process would involve reading all of the data from the good copy 16 and writing every stride 24 of the distributed array 10 which would take a long time to complete and place a heavy workload on the storage controller 14. During the time that it takes to complete this process the user only has a single copy of their data available. Not being able to recover an array can affect many logical volumes. The impact of the loss of an array often results in a restore from a user backup, which is separate from the primary and secondary copies in represented by the virtualisation layer 22c in FIG. 2, which can be many 100 TB to restore from an archive. Another alternative approach to recovery in this scenario is a complete resync from another copy. This can result in many 100 TB of data being recopied.

The storage controller 14 operates a recovery process that is managed by the RAID layer 22d. When a disaster occurs such as the three drive failures shown in FIG. 3, the data on the array 10 is no longer available. After the failed drives 12 have been replaced, the RAID layer 22d will instigate a recovery process by locating strides 24 on the array 10 that are no longer available due to the loss of data strips and that cannot be recovered by a normal parity reconstruction. There will typically be multiple strides 24, but they will be small percentage of the overall stride count. For each of these strides 24, the RAID layer 22d recovers the lost data by requesting the data on that strip from the component 22 above in the component stack 20. This is effectively a read operation for a range of lbas back up the stack 20.

If the component 22 above has a copy of the data then that component 22 returns the data down the stack 20, otherwise that component 22 performs any reverse address translations necessary and passes the request to the component 22 above. In turn, each component 22 in the stack 20 tries to locate a copy of the data or passes the request on. When the data is returned back down the stack 20, the RAID layer 22d will rewrite that stride 24. When all strides 24 that had three lost strips have been rewritten, the data on the array 10 will be available again. The recovery process would then preferably recover the strides 24 with one or two lost strips using normally parity reconstruction.

In the example given above, where the data stored on the distributed array 10 is mirrored to some independent storage 16, the reverse reads up the stack 20 are guaranteed to find another copy of the data either on the independent storage 16 or in a memory buffer in the mirroring component 22b where it is in the process of being written. Other storage configurations might not guarantee to find every stride 24 of data, but might find some in for example a cache component in the stack 20. Requests that do not have the data for a stride 24 returned from the upwards read will not be reconstructed using this scheme, but any reconstructed strides 24 will mean less potential data loss if the user does not have another copy of this data.

This method used by the storage controller 14 can also be used to patch up small data losses due to bad sectors, sometimes referred to as "kill sectors" that might be found in an otherwise RAID repairable array 10. Bad disk sectors that cannot be read from are sometimes found during RAID recovery, which involves reading large amounts of data that might not have been read for some time depending on the scrubbing schedule. These sometimes result in lost data due to the already compromised recovery scheme. This method of operation of the storage controller 14 provides a way to restore these small lost data areas without having to restore the whole array.

Figure 4:
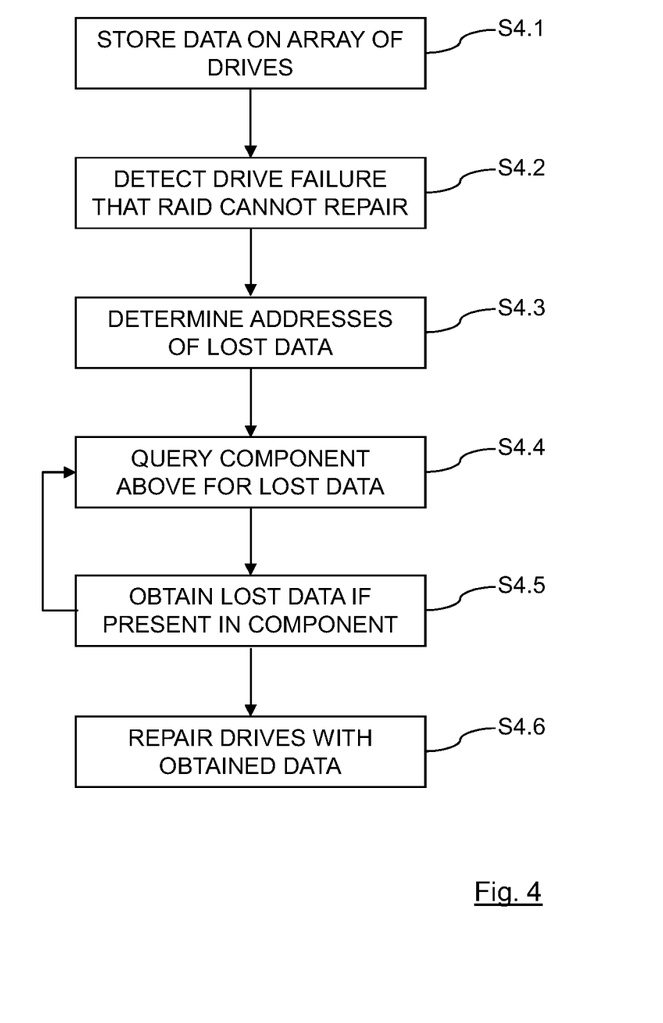
FIG. 4 is a flowchart of a method of operating the data storage system.

The methodology of the operation of the storage controller 14 is summarised in the flowchart of FIG. 4. The method concerns operating a data storage system which comprises a primary storage system 10 comprising an array of drives 12 and a storage controller 14 which is connected to the primary storage system and comprising a stack 20 of storage components 22, a storage component 22d of the stack 20 of components arranged to operate a data redundancy scheme for the primary storage system 10.

The method comprises the steps of, firstly step S4.1, which comprises storing a set of data on the primary storage system 10, secondly step S4.2, which comprises detecting a failure on one or more of the drives 12 of the array 10 of drives 12, and thirdly step S4.3 which comprises determining a set of addresses defining data that cannot be completely repaired by the data redundancy scheme. Once a failure has occurred that cannot be corrected with RAID redundancy, then the storage controller 14 must attempt to restore data from other sources.

The next step of the method is step S4.4, which comprises (starting with the storage component 22d operating the data redundancy scheme), each storage component 22 querying the storage component 22 directly above with the set of addresses for the data that cannot be completely repaired by the data redundancy scheme, which is followed by step S4.5, which comprises obtaining, from one or more storage components 22, the data that cannot be completely repaired by the data redundancy scheme. In this way, the addresses of the data that needs to be repaired is passed up the component stack 20, thereby acquiring data as the query is passed up the component stack 20.

The final step of the method is step S4.6, which comprises repairing the data on the primary storage system 10 with the obtained data from the one or more storage components 22. Some or all of the missing data may have been recovered from the components 22 within the component stack 20 that are above the RAID component 22d. Data may be being used in other components 22 for other purposes or may be cached within one or more components 22 that can be recovered and used to repair the missing data from the data array 10. Data recovered from the different components 22 is passed down the component stack 20 to the RAID layer 22e to perform the repair of the data within the array of drives 12.

Preferably, after repairing the data on the primary storage system 10 with the obtained data from one or more storage components 22, the storage controller 14 is arranged to repair remaining unrepaired data with the data redundancy scheme. Once data has been recovered from above the RAID layer 22d and has been passed down to the RAID layer 22d to be repaired within the disk array 10, then the normal RAID operation of recovery of data using the data redundancy within RAID can be carried out. This will in most situations result in the recovery of more lost data and may complete the repair process in recovering all of the lost data.

If the data storage system further comprises a secondary storage system 16 connected to the storage controller 14, then the storage controller 14 normally stores a backup of the data on the secondary storage system 16 and, after repairing the data on the primary storage system 10 with the obtained data from one or more storage components 22, the storage controller 14 is preferably arranged to repair remaining unrepaired data with the data from the secondary storage system 16. In this situation, the entirety of the data can be restored, with any data that cannot be found within the component stack 20 being obtained from the secondary storage system 16.

In one preferable arrangement, the storage controller 14 is arranged so that the upward reading steps that start with the storage component 22d operating the data redundancy scheme, such that each storage component 22 queries the storage component 22 directly above with the set of addresses for the data that cannot be completely repaired by the data redundancy scheme and obtains, from one or more storage components 22, the data that cannot be completely repaired by the data redundancy scheme, terminates once all of the data that cannot be completely repaired by the data redundancy scheme has been obtained. This allows the process to work upwards through the component stack 20 until all the missing data has been recovered and then passed down to the RAID layer for the repair operation.

Figure 5:
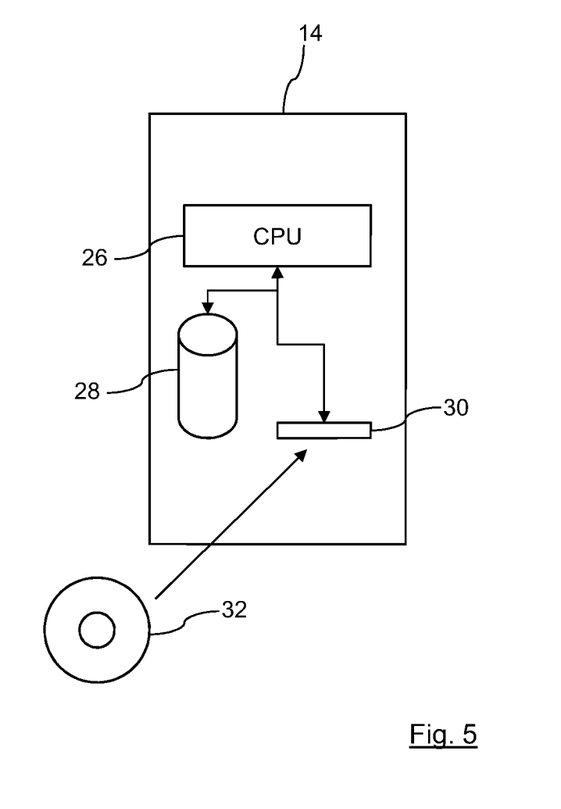
FIG. 5 is a schematic diagram of the storage controller.

FIG. 5 shows more detail of one embodiment of the storage controller 14. The storage controller 14 comprises a processor 26 that is maintaining and operating the stack 20 of storage components 22. The processor 26 of the storage controller 14 is also connected to a local storage device 28 and to a local interface 30. A computer readable storage medium 32 is provided, which is a CD-ROM 32 storing a computer program product that can be used to control the processor 26 to operate the storage controller 14. The processor 26 executes instructions from the computer program product to operate the storage controller 14. The storage controller 14 is connected to the drives 12 of the array 10 and in the preferred embodiment is also connected to a secondary storage system 16, which stores a backup copy of the data stored by the main array 10.

In FIG. 5, the storage controller 14 is shown as single component, but in a second embodiment of the storage controller 14, multiple physical boxes of the same form as that shown in FIG. 5 may be used to make up the storage controller 14, with the location of each node being such that they may or may not be local and are therefore connected together via fibre channel, Ethernet, IP (iSCSI), FCOE or some other connection technology.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method of operating a data storage system comprising a primary storage system comprising an array of drives and a storage controller connected to the primary storage system and comprising a stack of storage components, a storage component of the stack of components arranged to operate a data redundancy scheme for the primary storage system, the method comprising:
    storing a set of data on the primary storage system;
    detecting a failure on one or more of the drives of the array of drives;
    determining a set of addresses defining data that cannot be completely repaired by the data redundancy scheme;
    starting with the storage component operating the data redundancy scheme, each storage component querying the storage component directly above with the set of addresses for the data that cannot be completely repaired by the data redundancy scheme;
    obtaining, from one or more storage components, the data that cannot be completely repaired by the data redundancy scheme; and
    repairing the data on the primary storage system with the obtained data from the one or more storage components.

2. The method according to claim 1, and further comprising, after repairing the data on the primary storage system with the obtained data from one or more storage components, repairing remaining unrepaired data with the data redundancy scheme.

3. The method according to claim 1, wherein the data storage system further comprises a secondary storage system connected to the storage controller, and wherein the method further comprises storing a backup of the data on the secondary storage system and, after repairing the data on the primary storage system with the obtained data from one or more storage components, repairing remaining unrepaired data with the data from the secondary storage system.

4. The method according to claim 1, wherein the steps of starting with the storage component operating the data redundancy scheme, each storage component querying the storage component directly above with the set of addresses for the data that cannot be completely repaired by the data redundancy scheme and obtaining, from one or more storage components, the data that cannot be completely repaired by the data redundancy scheme, terminate once all of the data that cannot be completely repaired by the data redundancy scheme has been obtained.

5. The method according to claim 1, wherein the step of querying the storage component directly above with the set of addresses for the data that cannot be completely repaired by the data redundancy scheme comprises reformatting the set of addresses according to an interface protocol of the storage component being addressed.

6. A data storage system comprising a primary storage system comprising an array of drives and a storage controller connected to the primary storage system and comprising a stack of storage components, a storage component of the stack of components arranged to operate a data redundancy scheme for the primary storage system, the storage controller arranged to:
    store a set of data on the primary storage system;
    detect a failure on one or more of the drives of the array of drives;
    determine a set of addresses defining data that cannot be completely repaired by the data redundancy scheme;
    starting with the storage component operating the data redundancy scheme, each storage component querying the storage component directly above with the set of addresses for the data that cannot be completely repaired by the data redundancy scheme;
    obtain, from one or more storage components, the data that cannot be completely repaired by the data redundancy scheme; and
    repair the data on the primary storage system with the obtained data from the one or more storage components.

7. The system according to claim 6, wherein the storage controller is further arranged, after repairing the data on the primary storage system with the obtained data from one or more storage components, to repair remaining unrepaired data with the data redundancy scheme.

8. The system according to claim 6, further comprising a secondary storage system connected to the storage controller, and wherein the storage controller is further arranged to store a backup of the data on the secondary storage system and, after repairing the data on the primary storage system with the obtained data from one or more storage components, repair remaining unrepaired data with the data from the secondary storage system.

9. The system according to claim 6, wherein the storage controller is arranged, when starting with the storage component operating the data redundancy scheme, each storage component querying the storage component directly above with the set of addresses for the data that cannot be completely repaired by the data redundancy scheme and obtaining, from one or more storage components, the data that cannot be completely repaired by the data redundancy scheme, to terminate once all of the data that cannot be completely repaired by the data redundancy scheme has been obtained.

10. The system according to claim 6, wherein the storage controller is arranged, when querying the storage component directly above with the set of addresses for the data that cannot be completely repaired by the data redundancy scheme, to reformat the set of addresses according to an interface protocol of the storage component being addressed.

11. A computer program product for controlling a data storage system comprising a primary storage system comprising an array of drives and a storage controller connected to the primary storage system and comprising a stack of storage components, a storage component of the stack of components arranged to operate a data redundancy scheme for the primary storage system, the computer program product comprising a non-transitory computer readable storage medium having program instructions embodied therewith, the program instructions executable by a processor to cause the processor to:
    store a set of data on the primary storage system;
    detect a failure on one or more of the drives of the array of drives;
    determine a set of addresses defining data that cannot be completely repaired by the data redundancy scheme;
    starting with the storage component operating the data redundancy scheme, each storage component querying the storage component directly above with the set of addresses for the data that cannot be completely repaired by the data redundancy scheme;

obtain, from one or more storage components, the data that cannot be completely repaired by the data redundancy scheme; and repair the data on the primary storage system with the obtained data from the one or more storage components.

12. The computer program product according to claim 11, and further comprising instructions for, after repairing the data on the primary storage system with the obtained data from one or more storage components, repairing remaining unrepaired data with the data redundancy scheme.

13. The computer program product according to claim 11, wherein the data storage system further comprises a secondary storage system connected to the storage controller, and further comprising instructions for storing a backup of the data on the secondary storage system and, after repairing the data on the primary storage system with the obtained data from one or more storage components, repairing remaining unrepaired data with the data from the secondary storage system.

14. The computer program product according to claim 11, wherein the instructions for starting with the storage component operating the data redundancy scheme, each storage component querying the storage component directly above with the set of addresses for the data that cannot be completely repaired by the data redundancy scheme and obtaining, from one or more storage components, the data that cannot be completely repaired by the data redundancy scheme, terminate once all of the data that cannot be completely repaired by the data redundancy scheme has been obtained.

15. The computer program product according to claim 11, wherein the instructions for querying the storage component directly above with the set of addresses for the data that cannot be completely repaired by the data redundancy scheme comprise instructions for reformatting the set of addresses according to an interface protocol of the storage component being addressed.

* * * * *